(12) United States Patent
Eilebrecht (10) Patent No.: US 11,301,474 B2
(45) Date of Patent: Apr. 12, 2022

(54) PARALLELIZED PARSING OF DATA IN CLOUD STORAGE

(71) Applicant: Microsoft Technology Licensing, LLC, Redmond, WA (US)

(72) Inventor: Eric Eilebrecht, Bothell, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 226 days.

(21) Appl. No.: 16/458,312

(22) Filed: Jul. 1, 2019

(65) Prior Publication Data
US 2020/0349164 A1    Nov. 5, 2020

Related U.S. Application Data

(60) Provisional application No. 62/843,181, filed on May 3, 2019.

(51) Int. Cl.
*G06F 16/93* (2019.01)
*G06F 16/2455* (2019.01)
*G06F 16/23* (2019.01)

(52) U.S. Cl.
CPC .... *G06F 16/24553* (2019.01); *G06F 16/2379* (2019.01)

(58) Field of Classification Search
CPC .............. G06F 16/24553; G06F 16/2379
See application file for complete search history.

(56) References Cited

U.S. PATENT DOCUMENTS

| | | | | |
|---|---|---|---|---|
| 6,105,022 A | * | 8/2000 | Takahashi | G06F 16/30 |
| 7,506,038 B1 | * | 3/2009 | Perrone | G06F 8/60 |
| | | | | 709/220 |
| 9,753,928 B1 | * | 9/2017 | Elmore | G06F 40/205 |
| 10,564,877 B1 | * | 2/2020 | Asokan | G06F 9/4498 |
| 2007/0067157 A1 | * | 3/2007 | Kaku | G06F 40/289 |
| | | | | 704/10 |
| 2012/0106366 A1 | * | 5/2012 | Gauvin | H04L 63/04 |
| | | | | 370/252 |

(Continued)

OTHER PUBLICATIONS

"International Search Report and Written Opinion Issued in PCT Application No. PCT/US20/026792", dated Jun. 4, 2020, 14 Pages.

(Continued)

*Primary Examiner* — Tarek Chbouki
(74) *Attorney, Agent, or Firm* — Alleman Hall Creasman & Tuttle LLP (57) ABSTRACT

An example method of parsing data in a distributed computing system includes assigning a worker k to scan a data chunk k at a data storage node at which data chunk k is stored, each of one or more data chunks including a partial record, receiving, from each worker k, a number of instances of a context-varying symbol, a position in the data chunk k of a first instance of a context-dependent symbol after an even number of instances of the context-varying symbol, and a position in the data chunk k of a first instance of the context-dependent symbol after an odd number of instances of the context-varying symbol, for each data chunk that includes a partial record, computing an adjusted data chunk including data from a later data chunk to complete the partial record, parsing the adjusted data chunks and executing a query against the plurality of records.

20 Claims, 6 Drawing Sheets

(56) References Cited

U.S. PATENT DOCUMENTS

| | | | |
|---|---|---|---|
| 2016/0006456 A1* | 1/2016 | Muramatsu | H03M 7/3084 707/693 |
| 2018/0004430 A1 | 1/2018 | Merritt et al. | |
| 2018/0089324 A1 | 3/2018 | Pal et al. | |
| 2018/0232425 A1 | 8/2018 | Das et al. | |
| 2018/0314751 A1 | 11/2018 | Filippi et al. | |
| 2018/0314883 A1 | 11/2018 | Saurav et al. | |
| 2020/0089750 A1* | 3/2020 | Ros | H04L 67/16 |
| 2020/0175093 A1* | 6/2020 | Johnson | G06F 40/109 |
| 2021/0103696 A1* | 4/2021 | Kim | G06F 40/12 |

OTHER PUBLICATIONS

"Univocity Parsers", Retrieved from: https://github.com/uniVocity/univocity-parsers, Jul. 8, 2019, 1 Page.

Asanovic, et al., The Landscape of Parallel Computing Research: A View from Berkeley, In Technical Report UCB/EECS-2006-183, University of California, Dec. 18, 2006, 56 Pages.

Armbrust, et al.,"Spark SQL: Relational Data Processing in Spark", In Proceedings of the ACM SIGMOD International Conference on Management of Data, May 27, 2015, pp. 1383-1394.

Zaharia, et al., "Resilient Distributed Datasets: A Fault-tolerant Abstraction for In-memory Cluster Computing", In Proceedings of the 9th USENIX Conference on Networked Systems Design and Implementation, Apr. 25, 2012, 14 Pages.

"ParaText", Retrieved from: https://github.com/wiseio/paratext, Jul. 8, 2019, 5 Pages.

Cheng, et al., "Parallel in-situ Data Processing with Speculative Loading", In Proceedings of the ACM SIGMOD International Conference on Management of Data, Jun. 18, 2014, pp. 1287-1298.

Blanas, et al., "Parallel Data Analysis Directly on Scientific File Formats", In Proceedings of the ACM SIGMOD International Conference on Management of Data, Jun. 18, 2014, pp. 385-396.

Mickunas, et al., "Parallel Compilation in a Multiprocessor Environment (Extended Abstract)", In Proceedings of the 1978 Annual Conference, Dec. 4, 1978, pp. 241-246.

Fischer, Charles, "On Parsing Context free Languages in Parallel Environments", In Technical Report 75-237, Department of Computer Science, Cornell University, Apr. 1975, 218 Pages.

Baccelli, et al., "On Parsing Arithmetic Expressions in a Multiprocessing Environment", In Journal of Acta Informatica, vol. 17, Issue 3, Aug. 1982, pp. 287-310.

Alagiannis, et al., "Nodb: Efficient Query Execution on Raw Data Files", In Proceedings of the 2012 ACM SIGMOD International Conference on Management of Data, May 20, 2012, pp. 241-252.

Alagiannis, et al., "NoDB: Efficient Query Execution on Raw Data Files", In Proceedings of the ACM SIGMOD International Conference on Management of Data, May 20, 2012, pp. 241-252.

Li, et al., "Mison: A Fast JSON Parser for Data Analytics", In Proceedings of the VLDB Endowment, vol. 10, Issue 10, Jun. 1, 2017, pp. 1118-1129.

Abouzied, et al., "Invisible Loading: Accessdriven Data Transfer from Raw Files into Database Systems", In Proceedings of the 16th International Conference on Extending Database Technology, Mar. 18, 2013, 10 Pages.

Muhlbauer, et al., "Instant Loading for Main Memory Databases", In Proceedings of the VLDB Endowment, vol. 6, Issue 14, Sep. 1, 2013, pp. 1702-1713.

Zhao, et al., "Hpar: A Practical Parallel Parser for Html-Taming HTML Complexities for Parallel Parsing", In Proceedings of ACM Transactions on Architecture and Code Optimization, vol. 10, Issue 4, Dec. 1, 2013, 25 Pages.

Idreos, et al., "Here are my Data Files. Here are my Queries. Where are my Results?", In Proceedings of 5th Biennial Conference on Innovative Data Systems Research, Jan. 9, 2011, 12 Pages.

"Google BigQuery", Retrieved from: https://cloud.google.com/bigquery, Jul. 8, 2019, 20 Pages.

Palkar, et al., "Filter Before you Parse: Faster Analytics on Raw Data with Sparser", In Proceedings of the VLDB Endowment, vol. 11, Issue 11, Jul. 1, 2018, pp. 1576-1589.

Melnik, et al., "Dremel: Interactive Analysis of Web-Scale Datasets", In Proceedings of the VLDB Endowment, vol. 3, Issue 1, Sep. 1, 2010, pp. 330-339.

Shafranovich, Y., "Common Format and MIME Type for Comma-Separated Values (CSV) Files", In Proceedings of Network Working Group, Request for Comments: 4180, Category: Information, Oct. 2005, 8 Pages.

"Apache Avro", Retrieved from: http://avro.apache.org/, May 20, 2019, 1 Page.

"Amazon Redshift", Retrieved from: https://aws.amazon.com/redshift/, Jul. 8, 2019, 13 Pages.

"Amazon Athena", Retrieved from: https://aws.amazon.com/athena, Jul. 8, 2019, 8 Pages.

Karpathiotakis, et al., "Adaptive Query Processing on RAW Data", In Proceedings of the VLDB Endowment, vol. 7, Issue 12, Aug. 1, 2014, pp. 1119-1130.

Lu, et al., "A Parallel Approach to XML Parsing", In Proceedings of the 7th IEEE/ACM International Conference on Grid Computing, Sep. 28, 2006, pp. 223-230.

Alblas, et al., "A Bibliography on Parallel Parsing", In Proceedings of ACM Sigplan Notices, vol. 29, Issue 1, Jan. 1, 1994, pp. 54-65.

Ge, et al., "Speculative Distributed CSV Data Parsing for Big Data Analytics", In Proceedings of the 2019 International Conference on Management of Data, Jun. 25, 2019, pp. 883-899.

\* cited by examiner

Ambiguous CSV Chunk: book,",",16\nBob,",",17

Interpretation 1: book,",",16\nBob,",",17

Interpretation 2: book,",",16\nBob,",",17

PARALLELIZED PARSING OF DATA IN CLOUD STORAGE

CROSS REFERENCE TO RELATED APPLICATIONS

This application claims priority to U.S. Provisional Patent Application Ser. No. 62/843,181, filed May 3, 2019, the entirety of which is hereby incorporated herein by reference for all purposes.

BACKGROUND

Increasing volumes of data are being stored in network-accessible distributed storage systems, which may be referred to as cloud storage.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to parallel parsing of data in a distributed computing environment. One disclosed example provides a method of parsing data comprising a plurality of records, the data distributed among a plurality of data storage nodes of a distributed computing system. The method comprises, for each data chunk k (k=1 to n) of n data chunks, assigning a worker k to scan the data chunk at a data storage node at which data chunk k is stored, wherein each of one or more data chunks comprises a partial record. The method further comprises receiving, from each worker k, a number of instances of a context-varying symbol in the data chunk k, a position in the data chunk k of a first instance of a context-dependent symbol after an even number of instances of the context-varying symbol, the context-dependent symbol having a first, structural meaning in a first context and a second, non-structural meaning in a second context, and a position in the data chunk k of a first instance of the context-dependent symbol after an odd number of instances of the context-varying symbol. For each data chunk that comprises a partial record, the method comprises computing an adjusted data chunk, the adjusted data chunk comprising data from a later data chunk to complete the partial record, and after completing all partial records, executing a query against the plurality of records.

DETAILED DESCRIPTION

Detailed Description. A cloud-based data storage system may allow customers to store a wide variety of data types. Some types of data stored as binary objects may comprise records in the form of semi-structured data, such as comma-separated value (CSV) data. A user of a cloud-based storage system may wish to run queries on such data objects to identify records of interest. However, parsing the data objects to run queries may pose challenges. For example, such a data object may be stored as many separate blocks of data distributed across multiple server computers, which may be located in different physical locations. Further, the storage service may split the stored data into blocks without alignment of record or field boundaries, and also may be unaware of the type of data being stored and how to properly align data block boundaries to fields and records.

As such data objects may be very large, parsing the data objects in serial, proceeding from block to block as records are sequentially identified, may be slow. Likewise, parsing such data in parallel at the data storage nodes may be difficult, as ambiguities may exist regarding the starting and ending positions of records where a symbol that has structural meaning within the data can also appear in a context where the symbol does not have structural meaning.

As a more specific example, the American Standard Code for Information Interchange (ASCII) "newline" character \n is used as a symbol to indicate a new line in the CSV data, and thus as a record delimiter. A combination of characters, such as the ASCII carriage-return followed by the ASCII newline character \r\n, may also be used as a record delimiter in the CSV data. However, these characters also may be used as text in CSV data when located between opening and closing quotation marks. Similarly, a comma in CSV data is used as a field delimiter, except when the comma is between opening and closing quotation marks, in which case the comma represents text. Other data formats may have similar contextual ambiguities. The term "context-varying symbol" is used herein to indicate a symbol (e.g. a quotation mark in CSV data) that can change the meaning of another symbol in the data. Further, the term "context-dependent symbol" is used herein to indicate a symbol (such as \n or a comma in CSV data) that may have structural meaning or non-structural meaning based upon where the symbol is located relative to a context-varying symbol. The term "symbol" as used herein may represent one or more characters in various instances.

With regard to all data blocks except a first block in an object to be parsed in parallel, parsing will start at an arbitrary point within the object, which introduces ambiguity regarding whether the arbitrary point is inside or outside of a quoted string. When the arbitrary point is inside of a quoted string, a next instance of a newline symbol does not mark the end of a record. On the other hand, when the arbitrary point is outside of a quoted string, the next instance of the newline symbol does mark the end of the record. A parser parsing a given data chunk (e.g. a block or other portion of a data object) may not have the context needed to resolve such ambiguity, as it only parses the given chunk and not all prior and later data chunks, and the chunks may not align with the beginnings and ends of records.

As one possible solution, a data processing system may parallelize parsing by transferring all chunks to a common location in a cloud-based storage system, and then parsing in parallel at the common location. However, this may consume significant network bandwidth within the cloud-based system, pose latency issues, and fail to utilize available computing resources at the data storage nodes.

Accordingly, examples are disclosed that relate to parallelizing parsing in a distributed computing system that more efficiently leverages the distribution of data chunks among different data storage nodes. Parsing is performed directly at each data storage node, which avoids the network latency and bandwidth usage issues associated with transferring data to a single location for parallel parsing at that location. Further, the disclosed examples leverage the computing resources available at the data storage nodes.

Briefly, the disclosed examples provide a two-pass approach for parallel parsing of semi-structured data, such as CSV data. The first pass of the two-pass approach, performed by workers at the data storage nodes, locates possible field and record boundaries in each chunk to form "adjusted chunks", which are data chunks that are adjusted in size to complete any partial records in the original chunks. The workers in different physical locations may send to a master only a small amount of data regarding possible field and record boundaries, rather than all of the data in the chunk, thereby preserving bandwidth. The second pass uses a parser to process complete records within each adjusted chunk. Unlike an approach in which data chunks are sequentially parsed to identify adjusted chunks, the disclosed two-pass approach determines boundaries for adjusted chunks in a fully parallel fashion.

Figure 1:
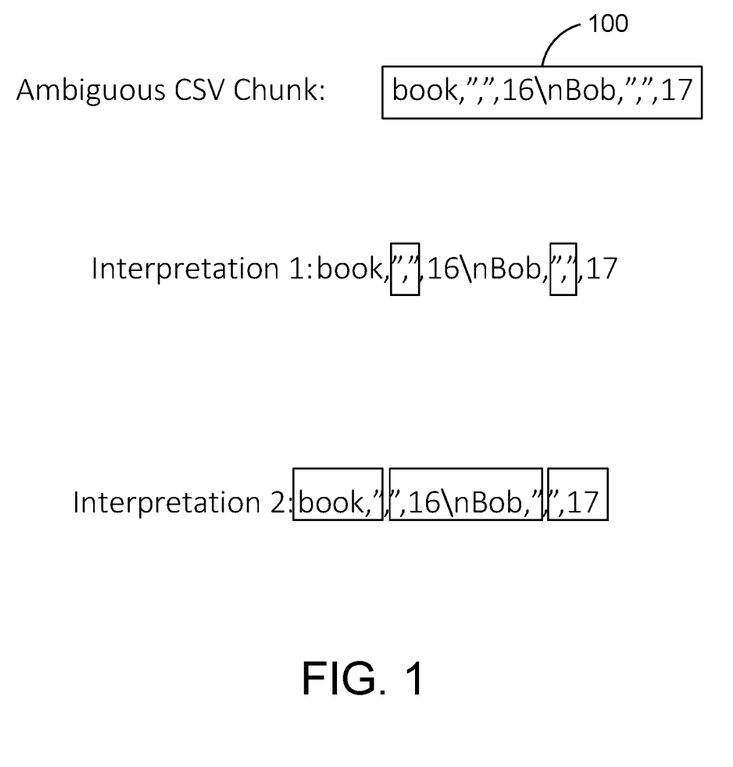
FIG. 1 shows an example of contextual ambiguity in comma-separated values (CSV) data.

Prior to discussing the two-step approach to parallelize parsing of data in a distributed computing system, FIG. 1 shows an example excerpt 100 of an ambiguous CSV data chunk 100. A CSV file includes a sequence of zero or more records, each separated by a newline symbol (\n), in which a record is a sequence of one or more fields separated by comma symbols (,). Each field within a record may be quoted or unquoted. A field containing quotation marks, commas, or newline symbols in a non-structural context must be quoted, which is represented as quotation marks surrounding a sequence of zero or more (escaped) characters. An embedded quote within a field must be escaped by preceding it with another quote, and white spaces are considered as a part of a field. It should be noted that the CSV format is not standardized, and some variations on the CSV format may use other delimiters (e.g. tab or space) to separate fields, or use an alternative character (e.g. backslash) to escape a quote inside a quoted field. The examples disclosed herein may be used with such variations.

In FIG. 1, the excerpt 100 may, for example, represent a beginning of a data chunk stored at a data storage node of a distributed computing system, such as a Hadoop distributed file system (HDFS) cluster. A parser that parses this data chunk may not be aware of the context for the data, and thus may be unable to resolve ambiguities regarding context-varying and context-dependent symbols within the data chunk.

For example, the excerpt 100 has two plausible interpretations based on schematics of the CSV file format. Interpretation 1 considers "book" as the end of a field, a quoted comma as a next field, followed by a numeric field, and then a newline symbol indicating the end of a record. "Bob" is the first field of a next record, followed by a quoted comma, followed by another numerical field. Interpretation 2 considers "book," as the end of a field, and ",16\nBob" as the next field, such that \n is not treated as a structural symbol. This is followed by ",17" as the beginning of a next field.

Depending upon the interpretation applied, a query against a data chunk comprising the excerpt 100 may return substantially different query results. Thus, the examples described herein provide a distributed parallel parsing framework to address such ambiguities in an efficient manner.

Figure 2:
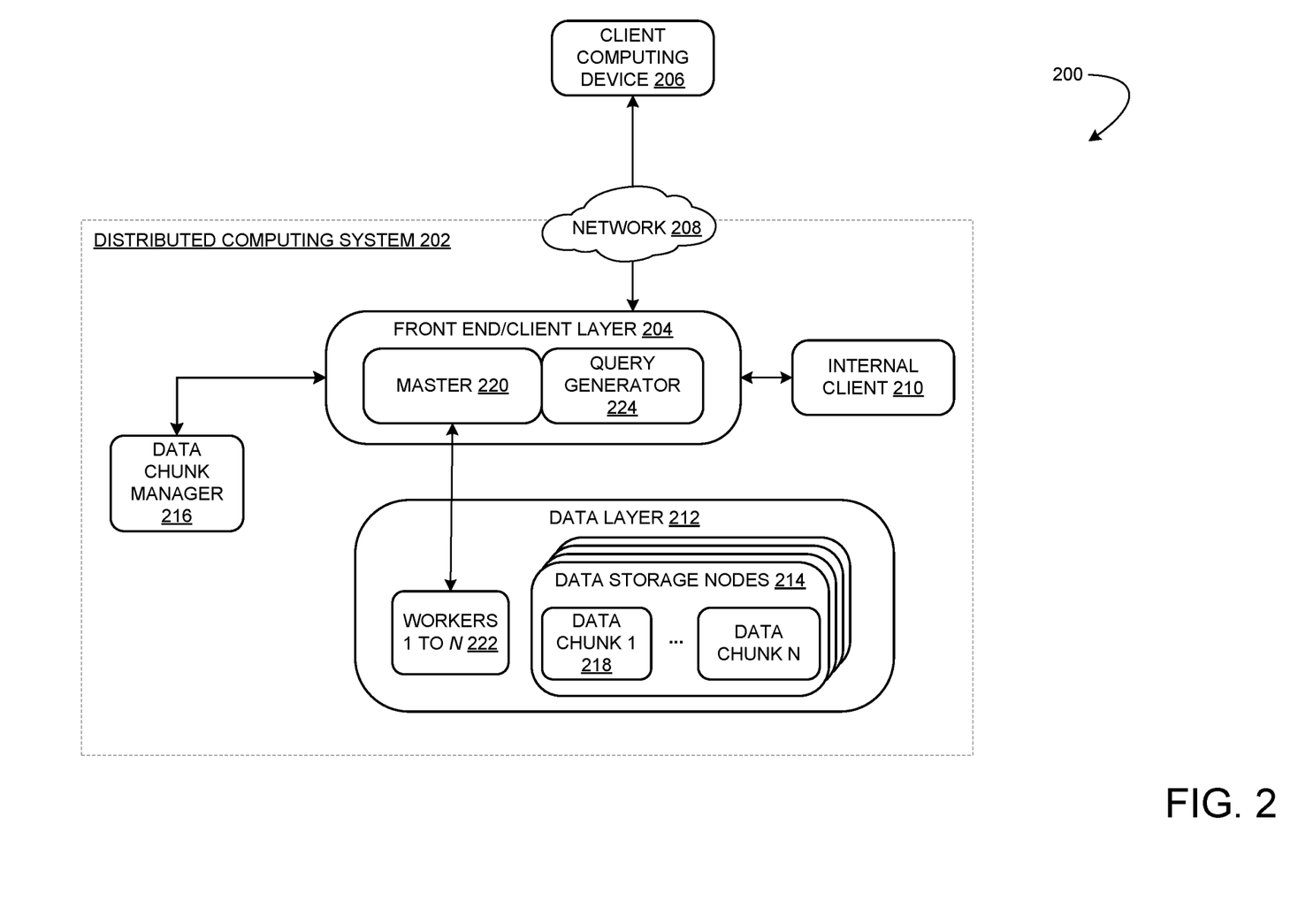
FIG. 2 depicts an example distributed computing system architecture.

FIG. 2 is a block diagram illustrating an example computing environment 200 in which the distributed parsing framework and parser may be implemented. The computing environment 200 comprises a distributed computing system 202, which may be implemented as a cloud-scale distributed storage system. The distributed computing system 202 comprises a plurality of computing devices located in one or more physical locations.

A front-end/client layer 204 of the distributed computing system 202 is configured to receive an input of a search query from a client 206 via a network 208. The front-end/client layer 204 also may receive queries from other services within the distributed computing system 202 (e.g. a cloud-hosted database service), represented as client 210.

The distributed computing system 202 further comprises a data layer 212 which includes a plurality of data storage nodes 214 representing the physical locations at which data is stored. Each blob (binary large object) or other structure of data within the distributed computing system 202 may be stored as n data chunks on one or more physical media. Some data chunks may comprise partial records, e.g. due to splitting the data into data chunks without regard to field or record boundaries. Each data chunk may comprise a portion of a block, a complete block, or more than one block of storage within a data storage node, and each data storage node may store one or more data blocks.

The data chunks may each comprise any suitable size. In some examples, the size of a data block is specified by an owner/administrator of the data. In other examples, a size of a data block is predetermined (e.g. 4 megabytes (MB)). Further, a size of a data chunk may be selected such that a single data chunk does not span a boundary of a data block and/or is not smaller than a size of a record.

A data chunk manager 216 stores a data structure (e.g. a table) that includes metadata for each blob or other file. For example, the data chunk manager 216 may store, for each data chunk of a blob, an address of a data storage node at which the data chunk is stored. For each data chunk k (k=1 to n) of n data chunks, a master 220 within the front-end/client layer 204 assigns a worker k to scan the data chunk 218 at a data storage node at which the data chunk k is stored.

In the first pass of the two-pass method, the n workers 222 scan the data chunks 1 to n in parallel. Each worker k may perform this scanning at a location close to the physical media at which the data is stored (e.g. at a computing device where the physical storage media is read from/written to). Each worker k determines, for its assigned data chunk k, a number of instances of a context-varying symbol in the data chunk k. In the example of CSV data, the context-varying symbol may comprise quotation marks. While described herein in the context of CSV data, it will be understood that the examples described herein also may be applicable to other forms of data, including JavaScript Object Notation (JSON), eXtensible Markup Language (XML), etc.

Each worker k also determines, for its assigned data chunk k, a position in the data chunk k of a first instance of a context-dependent symbol after an even number of instances of the context-varying symbol. Further, each worker k determines, for its assigned data chunk k, a position in the data chunk k of a first instance of the context-dependent symbol after an odd number of instances of the context-varying symbol. The context-dependent symbol is a symbol which has a first, structural meaning in a first context and a second, non-structural meaning in a second context. In examples that the data comprises CSV data, the context-dependent symbol may comprise a newline symbol (\n), and/or a record delimiting symbol (,). In other examples, any suitable symbol or collection of symbols may be used as the context-dependent symbol.

After scanning the assigned data chunk k, each worker 222 sends the resulting data to the master 220. These data provide the master 220 a big-picture understanding of a structure of each data chunk in terms of context-varying symbols and context-dependent symbols within the data chunk, without having to send the entire chunk to the master. Instead, each worker sends only a small amount of data, thereby conserving bandwidth within the distributed computing system.

With the data received from the workers, the master 220 can learn whether, for each data chunk, whether the entire data chunk included an odd or even number of instances of the context-varying symbol, and positions of two potential first record boundaries based upon the positions of the first instance of the context-dependent symbol after the even number of instances of the context-varying symbol and after the odd number of instances of the context-varying symbol.

The master 220 sequentially iterates over the determinations received for all n data chunks and computes a starting record position of each adjusted data chunk. For each data chunk that comprises a partial record, the master 220 computes an adjusted data chunk that includes data from a later data chunk to complete the partial record. The master 220 knows that zero (an even number of instances) context-varying symbols occur prior to the first data chunk (k=1). The master 220 thus may parse the first data chunk for a record boundary after an even number of instances of the context-varying symbol in the data chunk. The master 220 then knows, for a next data chunk (e.g. k=2), whether the number of instances of the context-varying symbol is an odd number or an even number, and may parse that data chunk for a record boundary based upon that information.

For each data chunk k, the master 220 determines a first record delimiter in the data chunk k. for example, by summing the number of instances of the context-varying symbol determined to be within the first k−1 data chunks. If the sum is an even number, then the position in the data chunk k of the first instance of the context-dependent symbol after the even number of instances of the context-varying symbol is determined to be the first record delimiter in the data chunk k. This process is analogous to applying a parity bit per data chunk accumulated by the master 220. Each instance that a data chunk includes an odd number of instances of the context-varying symbol, the parity bit may be toggled to select which first record boundary (e.g. first instance of the context-dependent symbol after an even number or after an odd number of instances of the context-varying symbol) is the correct record boundary in a current chunk. In the example of CSV data, an even number sum may indicate that the data chunk k does not start in the middle of a quoted field, and the first newline symbol after an even number of quotation marks (including zero) is the first record delimiter in this data chunk. Otherwise, if the sum is an odd number, then the position in the data chunk k of the first instance of the context-dependent symbol after the odd number of the instances of quotation marks is the first record delimiter in the data chunk k. The end position of each adjusted data chunk may be obtained based on the starting position of the subsequent adjusted chunk.

Figure 3:
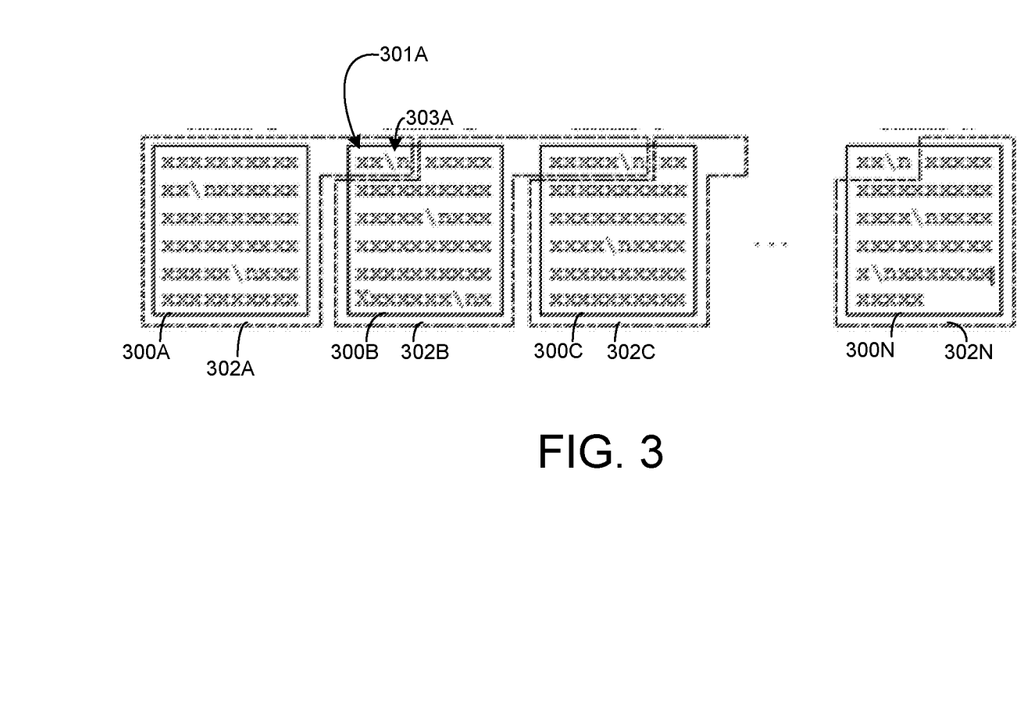
FIG. 3 schematically shows example data chunks and example adjusted data chunks.

FIG. 3 schematically shows example data chunks (indicated by solid lines 300A-300N) and adjusted data chunks (indicated by dashed lines 302A-302N). In this example, the data contained within each data chunk 300A-300N comprises CSV data, and each data chunk comprises one or more partial records. Using the information received from each worker, the master first determines an adjusted data chunk 302A for the first data chunk 300A. In this example, the adjusted data chunk 302A comprises a region between the beginning of the first data chunk 300A and an end portion of the partial record 301A' at the beginning of the second data chunk 300B, as defined by a first newline symbol 303A after the end of the first data chunk 300A. The master may sequentially determine adjusted data chunks 302B-302N for each of the remaining data chunks 300B-300N in the data input. If a data chunk does not contain any record delimiters, its adjusted data chunk may be empty, as it is fully within the prior adjusted data chunk.

Returning to FIG. 2, the master 220 parses the adjusted data chunks in the second pass of the two-pass approach to locate individual records within the adjusted data chunks. Once offsets of record boundaries are known, the master 220 may push queries to respective data storage nodes 214 and extract information from records within those ranges of offsets. This may help to decouple parsing from distributing processing. As indicated in FIG. 2, the front-end/client layer 204 comprises a query generator 224 configured to push a query received from the client computing device 206 and/or the internal client 210 to the data storage nodes 214.

Figure 4:
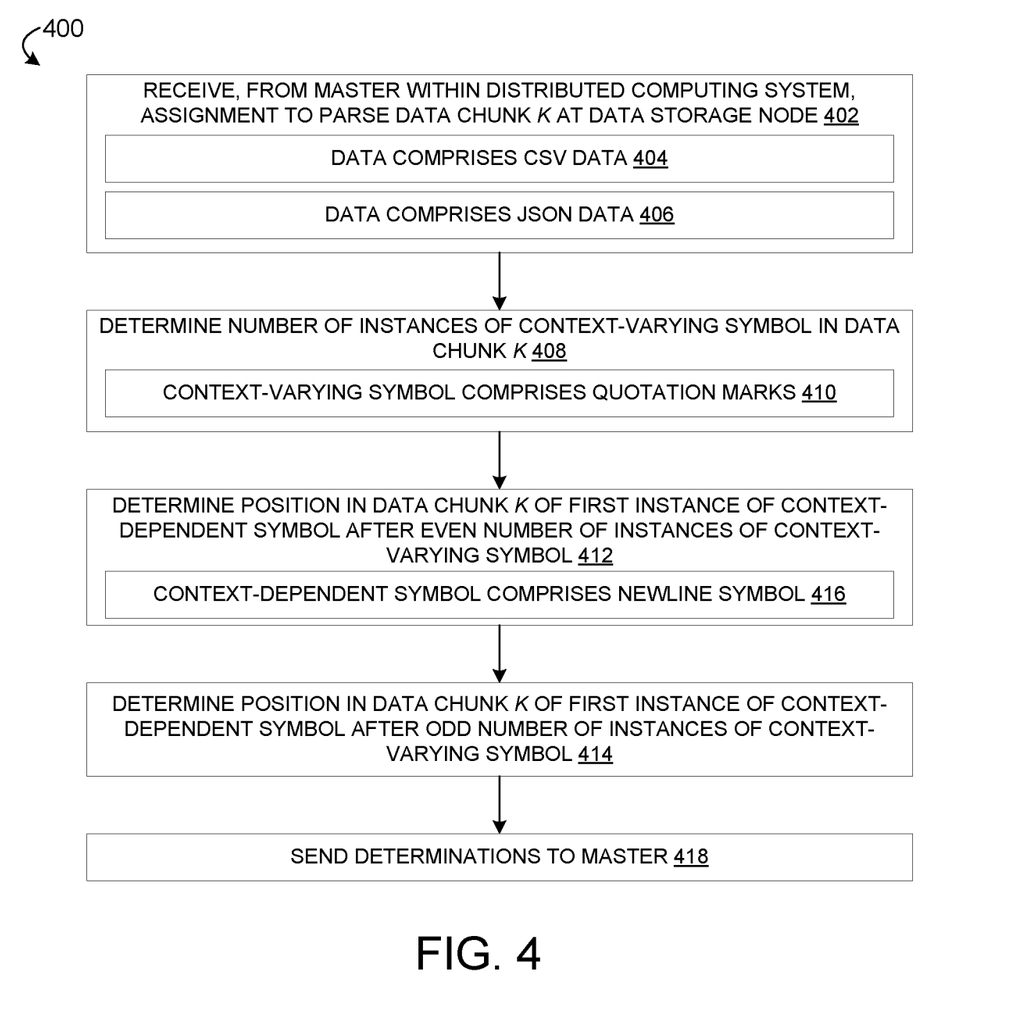
FIG. 4 is a flow diagram illustrating an example method of parsing data distributed among a plurality of data storage nodes of a distributed computing system.

FIG. 4 is a flow diagram illustrating an example method 400 of parsing data comprising a plurality of records, in which the data is distributed among a plurality of data storage nodes of a distributed computing system and in which the data comprises context-varying and context-dependent symbols as described above. Method 400 may be implemented as stored instructions executable by a logic subsystem of a worker k (k=1 to n) of n workers in the distributed computing system. Further, method 400 may be implemented in parallel by each worker of the n workers to parallelize parsing of data in the distributed computing system.

At 402, method 400 comprises receiving, from a master within the distributed computing system, an assignment to scan a data chunk k at a data storage node at which the data chunk k is stored. The data chunk k may comprise any suitable type of data. Examples include CSV data 404 and JSON data 406.

At 408, method 400 comprises determining, for the data chunk k, a number of instances of a context-varying symbol in the data chunk k. In one specific example, the context-varying symbol may comprise quotation marks, as indicated at 410.

At 412, method 400 comprises determining a position in the data chunk k of a first instance of a context-dependent symbol after an even number of instances of the context-varying symbol. At 414, method 400 comprises determining a position in the data chunk k of a first instance of the context-dependent symbol after an odd number of instances of the context-varying symbol. The context-dependent symbol comprises a first, structural meaning in a first context and a second, non-structural meaning in a second context. In one specific example, the context-dependent symbol may comprise a newline symbol, as indicated at 416. At 418, method 400 comprises sending these three determinations to a master.

Figure 5:
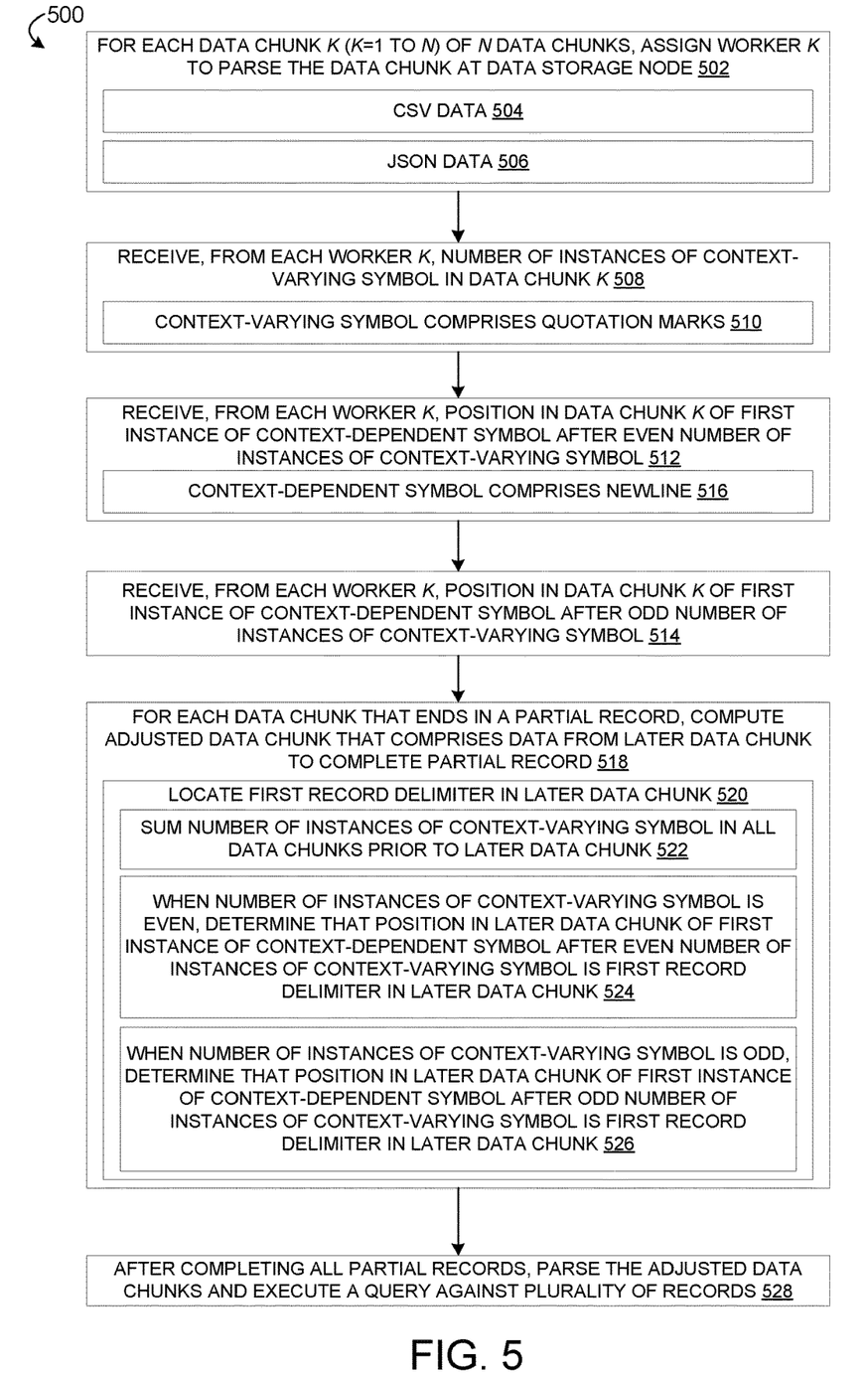
FIG. 5 is a flow diagram illustrating aspects of an example two-pass method for parallel parsing of data in a distributed computing environment.

FIG. 5 is a flow diagram illustrating an example method 500 of parsing data comprising a plurality of records, in which the data is distributed among a plurality of data storage nodes of a distributed computing system. Method 500 may be implemented as stored instructions by a master within the distributed computing system.

At 502, method 500 comprises, for each data chunk k (k=1 to n) of n data chunks, assigning a worker k to scan the data chunk at a data storage node at which the data chunk k is stored. Each of one or more data chunks may comprise a partial record. Any suitable type of data may be used, including CSV data 504 or JSON data 506.

The n data chunks are scanned by n workers operating in parallel. At 508, method 500 comprises receiving, from each worker k, a number of instances of a context-varying symbol in the data chunk k. In one specific example, the context-varying symbol may comprise quotation marks, as indicated at 510.

Further, as indicated at 512, method 500 comprises receiving, from each worker k, a position in the data chunk k of a first instance of a context-dependent symbol after an even number of instances of the context-varying symbol. Additionally, at 514, method 500 comprises receiving, from each worker k, a position in the data chunk k of a first instance of the context-dependent symbol after an odd number of instances of the context-varying symbol. The context-dependent symbol comprises a first, structural meaning in a first context and a second, non-structural meaning in a second context. In one specific example, the context-dependent symbol comprises a newline symbol, as indicated at 516.

After receiving this information from the workers, the master may sequentially iterate over the information received from the workers to compute, at 518, adjusted data chunks. The adjusted data chunk for a current data chunk may comprise data from a later data chunk that completes a partial record at an end of the current data chunk. Thus, where the current data chunk ends in a partial record, computing the adjusted data chunk for the current data chunk may comprise, at 520, locating a first record delimiter in the later data chunk that follows the end of the current data chunk (the first record delimiter of the current data chunk, which defines a beginning of the adjusted data chunk for the current data chunk, was previously determined in a same manner). Determining the first record delimiter in the later data chunk may comprise summing the number of instances of the context-varying symbol for all prior data chunks including the current data chunk, as indicated at 522. When the number of instances is an even number, then the position in the later data chunk of the first instance of the context-dependent symbol after the even number of instances of the context-varying symbol is the first record delimiter in the later data chunk, as indicated at 524. When the number of instances determined at 522 is an odd number, then the position in the later data chunk of the first instance of the context-dependent symbol after the odd number of instances of the context-varying symbol is the first record delimiter in the later data chunk, as indicated at 526. The later data chunk may be a next data chunk k+1, or may be after data chunk k+1 if data chunk k+1 contains no record delimiters.

After completing all partial records to form adjusted data chunks, method 500 comprises, at 528, parsing the adjusted data chunks and executing a query against the plurality of records. In this manner, the distributed computing system may decouple parsing and processing of the data.

While described in the context of CSV data, the principles of parallel parsing of semi-structured data are general. For example, the disclosed examples may be extended for use with other plain-text formats such as JSON and XML, that may include similar ambiguities regarding symbols that can represent both structure and non-structure.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
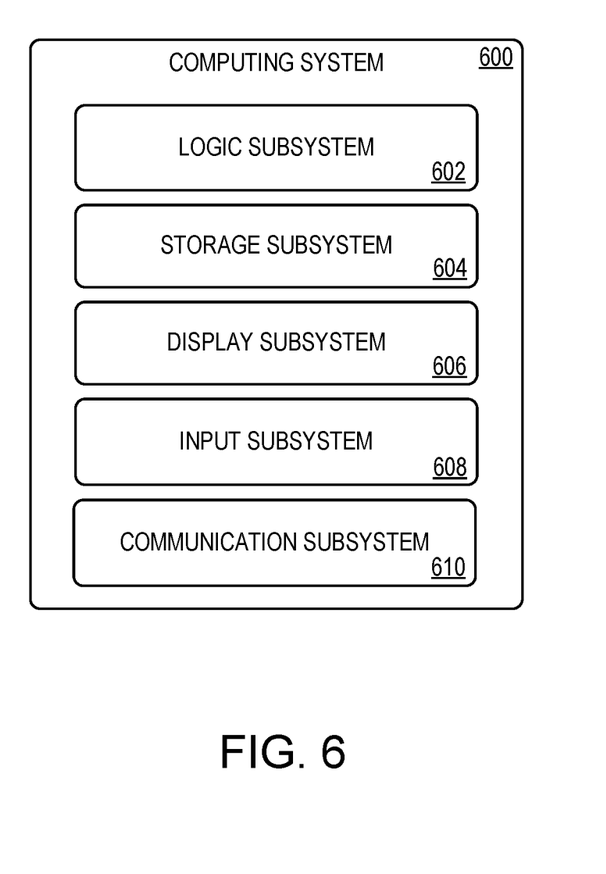
FIG. 6 is a block diagram illustrating an example computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 602 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 600 implemented to perform a particular function. In some cases, a program may be instantiated via logic machine 602 executing instructions held by storage machine 604. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Another example provides, enacted on a distributed computing system, a method of parsing data comprising a plurality of records, the data distributed among a plurality of data storage nodes of the distributed computing system, the method comprising, for each data chunk k (k=1 to n) of n data chunks, assigning a worker k to scan the data chunk at a data storage node at which data chunk k is stored, wherein each of one or more data chunks comprises a partial record, receiving, from each worker k, a number of instances of a context-varying symbol in the data chunk k, a position in the data chunk k of a first instance of a context-dependent symbol after an even number of instances of the context-varying symbol, the context-dependent symbol having a first, structural meaning in a first context and a second, non-structural meaning in a second context, and a position in the data chunk k of a first instance of the context-dependent symbol after an odd number of instances of the context-varying symbol, for each data chunk that comprises a partial record, computing an adjusted data chunk, the adjusted data chunk comprising data from a later data chunk to complete the partial record, and after completing all partial records, parsing the adjusted data chunks and executing a query against the plurality of records. In such an example, the data may additionally or alternatively comprise comma-separated values (CSV) data. In such an example, the data may additionally or alternatively comprise JavaScript Object Notation (JSON) data. In such an example, the context-varying symbol may additionally or alternatively comprise quotation marks. In such an example, the context-dependent symbol may additionally or alternatively comprise a newline symbol. In such an example, for each data chunk that ends in a partial record, computing the adjusted data chunk may additionally or alternatively comprise locating a first record delimiter in the later data chunk by summing a number of instances of the context-varying symbol in all data chunks prior to the later data chunk, when the number of the context-varying symbol in the all data chunks prior to the later data chunk is an even number, then determining that the position in the later data chunk of the first instance of the context-dependent symbol after the even number of the instances of the context-varying symbol is the first record delimiter in the later data chunk, and when the number of the quotation marks in the all data chunks prior to the later data chunk is an odd number, then determining that the position in the later data chunk of the first instance of the context-dependent symbol after the odd number of the instances of the context-varying symbol is the first record delimiter in the later data chunk. In such an example, computing the first record delimiter in the later data chunk may additionally or alternatively comprise calculating a parity bit.

Another example provides, enacted by a worker k (k=1 to n) of n workers in a distributed computing system, a method of parsing data comprising a plurality of records, the data distributed among a plurality of data storage nodes of the distributed computing system, the method comprising receiving, from a master within the distributed computing system, an assignment to scan a data chunk k at a data storage node at which the data chunk k is stored, determining, for the data chunk k, information comprising a number of instances of a context-varying symbol in the data chunk k, a position in the data chunk k of a first instance of a context-dependent symbol after an even number of instances of the context-varying symbol, the context-dependent symbol having a first, structural meaning in a first context and a second, non-structural meaning in a second context, and a position in the data chunk k of a first instance of the context-dependent symbol after an odd number of instances of the context-varying symbol, and sending, to the master, the information determined. In such an example, the data may additionally or alternatively comprise comma-separated values (CSV) data. In such an example, the data may additionally or alternatively comprise JavaScript Object Notation (JSON) data. In such an example, the context-varying symbol may additionally or alternatively comprise quotation marks. In such an example, the context-dependent symbol may additionally or alternatively comprise a newline symbol.

Another example provides a distributed computing system comprising a logic subsystem and memory storing instructions executable by the logic subsystem to, for each data chunk k (k=1 through n) on n data chunks, assign a worker k to scan the data chunk at a data storage node at which the data chunk k is stored, wherein each of one or more data chunks comprises a partial record, receive, from each worker k, a number of instances of a context-varying symbol in the data chunk k, a position in the data chunk k of a first instance of a context-dependent symbol after an even number of instances of the context-varying symbol, the context-dependent symbol having a first, structural meaning in a first context and a second, non-structural meaning in a second context, and a position in the data chunk k of a first instance of the context-dependent symbol after an odd number of instances of the context-varying symbol, for each data chunk that comprises a partial record, compute an adjusted data chunk, the adjusted data chunk comprising data from a later data chunk to complete the partial record, and after completing all partial records, parse the adjusted data chunks. In such an example, the master may additionally or alternatively be configured to receive a user input of a query, and execute the query against the records in the adjusted data chunks. In such an example, the data may additionally or alternatively comprise comma-separated values (CSV) data. In such an example, the data may additionally or alternatively comprise JavaScript Object Notation (JSON) data. In such an example, the context-varying symbol may additionally or alternatively comprise quotation marks. In such an example, the context-dependent symbol may additionally or alternatively comprise a newline. In such an example, the distributed computing system may additionally or alternatively comprise a plurality of data storage nodes at which the n data chunks are stored. In such an example, the instructions may additionally or alternatively be executable, for each data chunk k, to assign the worker k to scan the data chunk based on a network proximity of the worker k to the data chunk.

Another example provides, enacted on a distributed computing system, a method of parsing data comprising a plurality of records, the data distributed among a plurality of data storage nodes of the distributed computing system, the method comprising, for each data chunk k (k=1 to n) of n data chunks, assigning a worker k to scan the data chunk at a data storage node at which data chunk k is stored, wherein each of one or more data chunks comprises a partial record, receiving, from each worker k, a number of instances of a context-varying symbol in the data chunk k, a position in the data chunk k of a first instance of a context-dependent symbol after an even number of instances of the context-varying symbol, the context-dependent symbol having a first, structural meaning in a first context and a second, non-structural meaning in a second context, and a position in the data chunk k of a first instance of the context-dependent symbol after an odd number of instances of the context-varying symbol, for each data chunk that comprises a partial record, computing an adjusted data chunk, the adjusted data chunk comprising data from a later data chunk to complete the partial record, and after completing all partial records, parsing the adjusted data chunks and executing a query against the plurality of records. In such an example, the data may additionally or alternatively comprise comma-separated values (CSV) data. In such an example, the data may additionally or alternatively comprise JavaScript Object Notation (JSON) data. In such an example, the context-varying symbol may additionally or alternatively comprise quotation marks. In such an example, the context-dependent symbol may additionally or alternatively comprise a newline symbol. In such an example, for each data chunk that ends in a partial record, computing the adjusted data chunk may additionally or alternatively comprise locating a first record delimiter in the later data chunk by: summing a number of instances of the context-varying symbol in all data chunks prior to the later data chunk, when the number of the context-varying symbol in the all data chunks prior to the later data chunk is an even number, then determining that the position in the later data chunk of the first instance of the context-dependent symbol after the even number of the instances of the context-varying symbol is the first record delimiter in the later data chunk, and when the number of the quotation marks in the all data chunks prior to the later data chunk is an odd number, then determining that the position in the later data chunk of the first instance of the context-dependent symbol after the odd number of the instances of the context-varying symbol is the first record delimiter in the later data chunk. In such an example, computing the first record delimiter in the later data chunk may additionally or alternatively comprise calculating a parity bit.

Another example provides, enacted by a worker k (k=1 to n) of n workers in a distributed computing system, a method of parsing data comprising a plurality of records, the data distributed among a plurality of data storage nodes of the distributed computing system, the method comprising receiving, from a master within the distributed computing system, an assignment to scan a data chunk k at a data storage node at which the data chunk k is stored, determining, for the data chunk k, information comprising a number of instances of a context-varying symbol in the data chunk k, a position in the data chunk k of a first instance of a context-dependent symbol after an even number of instances of the context-varying symbol, the context-dependent symbol having a first, structural meaning in a first context and a second, non-structural meaning in a second context, and a position in the data chunk k of a first instance of the context-dependent symbol after an odd number of instances of the context-varying symbol, and sending, to the master, the information determined. In such an example, the data may additionally or alternatively comprise comma-separated values (CSV) data. In such an example, the data may additionally or alternatively comprise JavaScript Object Notation (JSON) data. In such an example, the context-varying symbol may additionally or alternatively comprise quotation marks. In such an example, the context-dependent symbol may additionally or alternatively comprise a newline symbol.

Another example provides a distributed computing system comprising a logic subsystem and memory storing instructions executable by the logic subsystem to, for each data chunk k (k=1 through n) on n data chunks, assign a worker k to scan the data chunk at a data storage node at which the data chunk k is stored, wherein each of one or more data chunks comprises a partial record, receive, from each worker k, a number of instances of a context-varying symbol in the data chunk k, a position in the data chunk k of a first instance of a context-dependent symbol after an even number of instances of the context-varying symbol, the context-dependent symbol having a first, structural meaning in a first context and a second, non-structural meaning in a second context, and a position in the data chunk k of a first instance of the context-dependent symbol after an odd number of instances of the context-varying symbol, for each data chunk that comprises a partial record, compute an adjusted data chunk, the adjusted data chunk comprising data from a later data chunk to complete the partial record, and after completing all partial records, parse the adjusted data chunks. In such an example, the instructions may additionally or alternatively be executable to receive a user input of a query, and execute the query against the records in the adjusted data chunks. In such an example, the data may additionally or alternatively comprise comma-separated values (CSV) data. In such an example, the data may additionally or alternatively comprise JavaScript Object Notation (JSON) data. In such an example, the context-varying symbol may additionally or alternatively comprise quotation marks. In such an example, the context-dependent symbol may additionally or alternatively comprise a newline. In such an example, the distributed computing system may additionally or alternatively comprise a plurality of data storage nodes at which the n data chunks are stored. In such an example, the instructions may additionally or alternatively be executable, for each data chunk k, to assign the worker k to scan the data chunk based on a network proximity of the worker k to the data chunk.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. Enacted on a distributed computing system, a method of parsing data comprising a plurality of records, the data distributed among a plurality of data storage nodes of the distributed computing system, the method comprising:
for each data chunk k of a plurality n of data chunks, assigning a worker k to scan the data chunk at a data storage node at which data chunk k is stored such that a plurality n of workers are assigned to the plurality n of data chunks, wherein each of one or more data chunks comprises a partial record, and wherein the plurality n of workers perform the scan of the plurality n of data chunks in parallel;
receiving, from each worker k,
a number of instances of a context-varying symbol in the data chunk k,
a position in the data chunk k of a first instance of a context-dependent symbol after an even number of instances of the context-varying symbol, the context-dependent symbol having a first, structural meaning in a first context and a second, non-structural meaning in a second context, and
a position in the data chunk k of a first instance of the context-dependent symbol after an odd number of instances of the context-varying symbol;
for each data chunk that comprises a partial record, computing an adjusted data chunk by
summing a number of instances of the context-varying symbol in all data chunks prior to the data chunk and in the data chunk, and
locating a first record delimiter in a later data chunk based at least in part on the number of instances of the context-varying symbol summed, the adjusted data chunk comprising data from the later data chunk to complete the partial record; and
after completing all partial records, parsing the adjusted data chunks and executing a query against the plurality of records.

2. The method of claim 1, wherein the data comprises comma-separated values (CSV) data.

3. The method of claim 1, wherein the data comprises JavaScript Object Notation (JSON) data.

4. The method of claim 1, wherein the context-varying symbol comprises quotation marks.

5. The method of claim 1, wherein the context-dependent symbol comprises a newline symbol.

6. The method of claim 1, wherein
when the number of the context-varying symbol in the all data chunks prior to the later data chunk is an even number, then determining that the position in the later data chunk of the first instance of the context-dependent symbol after the even number of the instances of the context-varying symbol is the first record delimiter in the later data chunk; and
when the number of the context-varying symbol in the all data chunks prior to the later data chunk is an odd number, then determining that the position in the later data chunk of the first instance of the context-dependent symbol after the odd number of the instances of the context-varying symbol is the first record delimiter in the later data chunk.

7. The method of claim 6, wherein computing the first record delimiter in the later data chunk comprises calculating a parity bit.

8. Enacted by each worker k (k=1 to n) of a plurality n of workers in a distributed computing system, a method of parsing data comprising a plurality of records, the data distributed among a plurality of data storage nodes of the distributed computing system, the method comprising:
receiving, from a master within the distributed computing system, an assignment to scan a data chunk k at a data storage node at which the data chunk k is stored, wherein the data chunk k is one of a plurality of data chunks stored on the distributed computing system, and wherein the plurality n of data chunks are scanned by the n workers operating in parallel;
determining, for the data chunk k, information comprising
a number of instances of a context-varying symbol in the data chunk k, wherein a sum of a number of instances of the context-varying symbol in all data chunks prior to the data chunk k and in the data chunk k indicates a location of a first record delimiter in a later data chunk,
a position in the data chunk k of a first instance of a context-dependent symbol after an even number of instances of the context-varying symbol, the context-dependent symbol having a first, structural meaning in a first context and a second, non-structural meaning in a second context, and
a position in the data chunk k of a first instance of the context-dependent symbol after an odd number of instances of the context-varying symbol; and
sending, to the master, the information determined.

9. The method of claim 8, wherein the data comprises comma-separated values (CSV) data.

10. The method of claim 8, wherein the data comprises JavaScript Object Notation (JSON) data.

11. The method of claim 8, wherein the context-varying symbol comprises quotation marks.

12. The method of claim 8, wherein the context-dependent symbol comprises a newline symbol.

13. A distributed computing system, comprising:
a logic subsystem; and
memory storing instructions executable by the logic subsystem to:
for each data chunk k of a plurality n of data chunks, assign a worker k to scan the data chunk at a data storage node at which the data chunk k is stored such that a plurality n of workers are assigned to the plurality n of data chunks, wherein each of one or more data chunks comprises a partial record, and wherein the plurality n of workers perform the scan of the plurality n of data chunks in parallel;
receive, from each worker k,
a number of instances of a context-varying symbol in the data chunk k,
a position in the data chunk k of a first instance of a context-dependent symbol after an even number of instances of the context-varying symbol, the context-dependent symbol having a first, structural meaning in a first context and a second, non-structural meaning in a second context, and
a position in the data chunk k of a first instance of the context-dependent symbol after an odd number of instances of the context-varying symbol;
for each data chunk that comprises a partial record, compute an adjusted data chunk by
summing a number of instances of the context-varying symbol in all data chunks prior to the data chunk and in the data chunk, and
locating a first record delimiter in a later data chunk based at least in part on the number of instances of the context-varying symbol summed, the adjusted data chunk comprising data from a later data chunk to complete the partial record; and
after completing all partial records, parse the adjusted data chunks.

14. The distributed computing system of claim 13, wherein the instructions are further executable to receive a user input of a query, and execute the query against the records in the adjusted data chunks.

15. The distributed computing system of claim 13, wherein the data comprises comma-separated values (CSV) data.

16. The distributed computing system of claim 13, wherein the data comprises JavaScript Object Notation (JSON) data.

17. The distributed computing system of claim 13, wherein the context-varying symbol comprises quotation marks.

18. The distributed computing system of claim 13, wherein the context-dependent symbol comprises a newline.

19. The distributed computing system of claim 13, further comprising a plurality of data storage nodes at which the n data chunks are stored.

20. The distributed computing system of claim 13, wherein the instructions are executable, for each data chunk k, to assign the worker k to scan the data chunk based on a network proximity of the worker k to a storage node storing the data chunk.

* * * * *